United States Patent [19]

Fleig

[11] 4,362,124

[45] Dec. 7, 1982

[54] ANALOG PAINT OUTPUT CONTROL

[75] Inventor: Gunther Fleig, Hanau, Fed. Rep. of Germany

[73] Assignee: Ransburg Corporation, Indianapolis, Ind.

[21] Appl. No.: 261,930

[22] Filed: May 8, 1981

Related U.S. Application Data

[63] Continuation of Ser. No. 35,105, May 1, 1979, abandoned.

[30] Foreign Application Priority Data

May 2, 1978 [DE] Fed. Rep. of Germany ....... 2819302

[51] Int. Cl.³ .............................................. B05C 5/00
[52] U.S. Cl. .................................. 118/698; 118/704; 118/314; 239/69
[58] Field of Search ............... 118/697, 698, 704, 695, 118/696, 685, 679, 668, 699, 314, 324; 239/69, 70, 112, 305; 137/607, 635

[56] References Cited

U.S. PATENT DOCUMENTS 3,348,774 10/1967 Wiggins ........................ 118/704 X
3,605,683 9/1971 Wiggins .......................... 118/685

*Primary Examiner*—John P. McIntosh
*Attorney, Agent, or Firm*—Jenkins, Coffey, Hyland, Badger & Conard

[57] ABSTRACT

A coating material quantity control system for the coating of articles in a production line operation having a plurality of coating material dispensing devices. Each device is connected to a plurality of coating material feed lines carrying various coating materials, each associated with a separate flow control device. A program control device, upon initiation of the selection of a new coating material type, assures the sequence of the necessary changeover operations. A common control is provided for the flow control devices associated with each coating material dispensing device. The program control device also controls control parameters in each such common control for the selected coating material type, and for variations in size of that portion of the article being coated which is before a particular coating material dispensing device.

10 Claims, 1 Drawing Figure

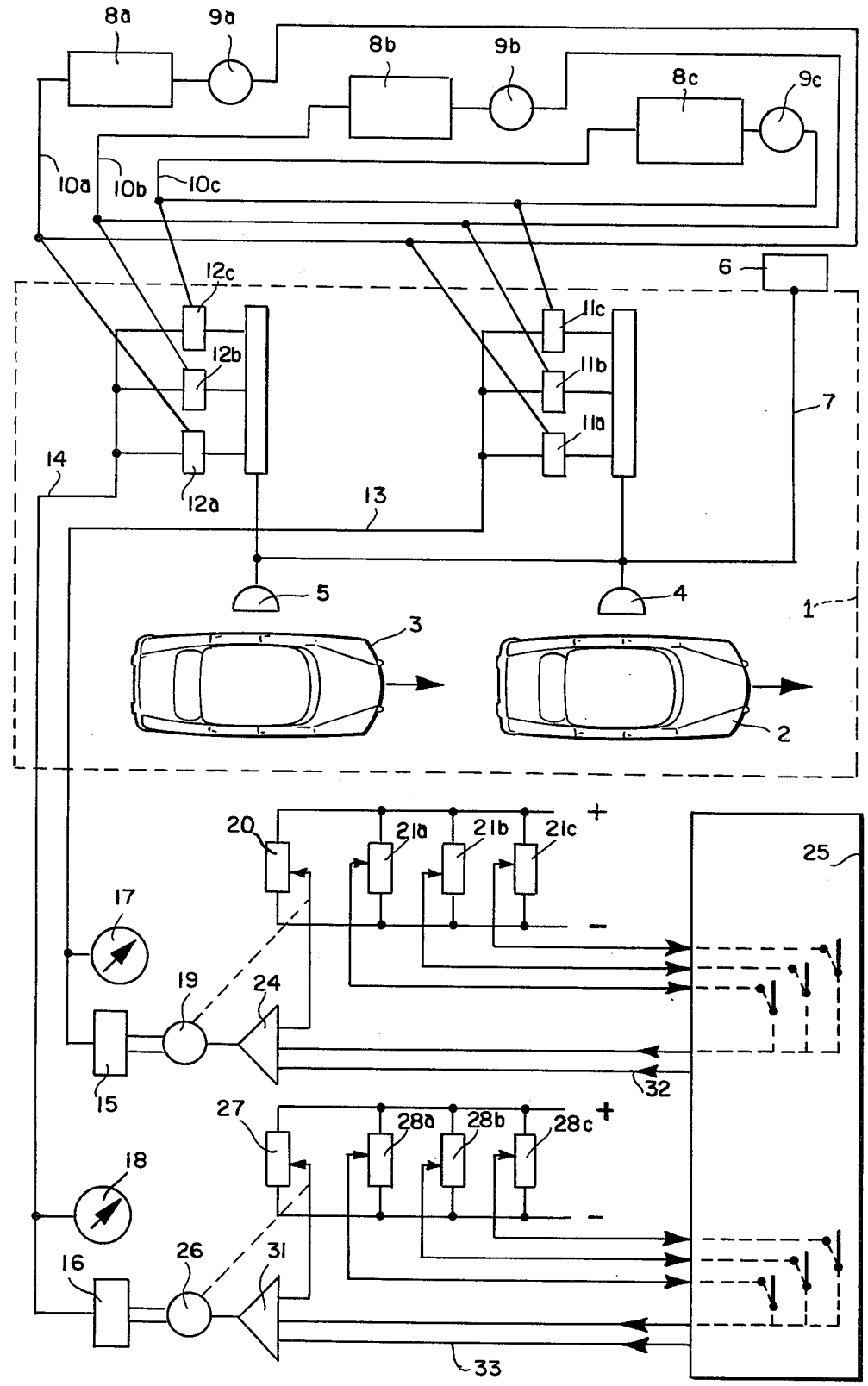

ANALOG PAINT OUTPUT CONTROL

This is a continuation of application Ser. No. 035,105, filed May 1, 1979, now abandoned.

The invention relates to automated assembly line-type coating systems, such as an enamel quantity control system for the finish enamel coating of automotive bodies in production line operation with a plurality of stationary enamel spray devices, each featuring at least one enamel atomizer. Each enamel atomizer is connected with a plurality of enamel feed lines carrying various different colored enamels. A separate enamel pressure regulator, controlled by means of a control air line, is assigned to each enamel feed line. A program control device, upon initiation of the selection of a new enamel type, causes the sequence start for the necessary changeover processes.

In enameling lines for automotive bodies, it is customary that the bodies that follow one another directly must be enameled with finish enamels of different colors. On enameling systems of such enameling lines there are enamel circulating lines provided in a number that corresponds to the number of different enamel colors and types, and in which the enamel is circulated, passing all withdrawal points and returning to the paint storage containers. The circulation of the enamel is necessary in order to keep its consistency uniform.

The enameling station of the enameling line features a plurality of enamel atomizing devices, (for instance twelve) which customarily operate according to the electrostatic principal. Each pair circulating line is connected with each enamel atomizing device, through a compressed air controlled pressure regulator. These enamel pressure regulators make it possible to reduce the enamel pressure in the circulating lines, contingent upon the pressure of the control air lines, from about 10 bars down to a pressure in the range of about two bars. Depending upon the enamel type (normal enamel, metal effect enamel) color, and other properties, various pressures are required for the individual enamels as they are fed to the enamel spray devices in order to obtain optimum enameling results (desired film thickness, uniform film thickness, absence of streaking and the like). When it is necessary to change from a currently used enamel to a new enamel, it is, therefore, necessary to adjust the pressure at which the new enamel will be fed to the enamel spray devices, through the enamel pressure regulator.

Conventional enamel amount control systems for such enameling lines are equipped with manually or remote-controlled enamel pressure regulators. With the remote-controlled enamel pressure regulators, the control is usually effected through control air with adjustable pressure. A pressure gauge and an air pressure regulator are required for each enamel pressure regulator. The latter serves to adjust the pressure of the control air for the enamel pressure regulator, with the enamel pressure always being proportional to the pressure of the control air. The pressure gauge monitors the control air pressure.

With an enameling station comprising, e.g., twelve enamel atomizers and fifteen paint circulating lines for the corresponding number of shades, not uncommon in enamel application on assembly lines, a total of 180 control air lines, 180 pressure gauges and 180 air pressure regulators are required since, as explained above, preferably each enamel shade should be adjustable individually for each enamel atomizer. The result is a large space demand and long connecting lines. If it were required that specific enamel atomizers apply various enamel amounts during the enameling operation, the space requirements would increase again.

On conventional enamel amount control systems it is not possible to continually change the enamel amount applied by one enamel atomizer. However, on an automobile assembly line at the automobile body "hip" level, a car body surface that changes its size continuously as it passes by (especially in the area of the front and the rear wheel well) is exposed to an enamel atomizer located in the generally horizontal position at the hip level. In order to optimally coat this zone of the car body and provide the hip level surface of the car body which continuously changes size with a closely controlled film thickness of enamel material, either the amount of enamel discharged or the speed of the passing vehicle would have to be adjusted to the surface.

The problem underlying the invention is to improve an automatic enamel quantity control system of the initially indicated type to the effect that the necessary technical expense and the space requirement for the system can be considerably reduced while at the same time a better controllability of the enameling process is accomplished. This problem is solved by providing a common control air line for the enamel pressure regulator of each enamel atomizer, and in that the program control device will also control the pressure in each control air line contingent upon the selected enamel type.

While heretofore for each enamel pressure regulator there was a separate air control line, and of necessity, a separate air pressure regulator and a separate pressure gauge provided, the invention requires for each enamel atomizing device only a common control air line. Therefore, the number of air pressure regulators, control air lines and pressure gauges can be drastically reduced. For instance, when twelve enamel atomizers and fifteen shades are provided, each enamel atomizer has a separate control air line. The number of pressure gauges, air control regulators and control air lines can be reduced from the previous 180 to 12. This permits a drastic reduction of the necessary technical expense. Also, the susceptibility to malfunction of the system is reduced. Also, the space requirement for the enamel quantity control system is reduced considerably.

Naturally, the same control air can be fed to the enamel pressure regulators for all those enamel atomizers jointly which operationally require the same enamel pressure. On the other hand, every enamel atomizer that must be operated with an enamel feed pressure that differs from that of other enamel atomizers must have a separate control air line. It is believed desirable that, for each control air line, an air pressure regulator be provided which is adjustable for changing the pressure in its control air line via a motor which is connected to drive a potentiometer wired in a branch of an electrical bridge. The motor keeps adjusting the potentiometer until the bridge is balanced by a resistor. This last-mentioned resistor has a value selected by an enamel quantity control system program control. This last-mentioned resistor is in another bridge branch. If, with a control of this type, the enamel amount discharged from a specific enamel atomizer is to be changed or the enamel atomizer is to be adjusted to a different enamel type, the changeable resistor in the other branch of the bridge must be changed to a predetermined value by the program control device. Until reaching a state of balance and the desired pressure in the control air line, the motor simultaneously changes its associated air control regulator and its associated potentiometer. In other words, the program control device will adjust the changeable resistor to a set value which is in a function of the desired pressure of the enamel to be fed to the enamel atomizer, whereas the potentiometer feeds the present actual value to the control circuit.

In case higher pressures are required, these can be added in preselectable steps of, e.g., 10% with the aid of an analog circuit provided specifically for that purpose.

The control pressure which is carried in each control air line at a given time can be read from a pressure gauge. The program control device desirably adjusts the pressure of at least some of the control air lines contingent upon the size of the automotive body surface that is located at any given time before the respective enamel atomizer, to be coated. As explained before, almost every enamel atomizer faces in its spray range, during the passage of a car body, a spray surface that changes in its size. Especially for the enamel atomizers located on the hip level, the facing area is particularly small in the range of the wheel wells. If the enamel atomizers arranged at the hip level were operated independently from the facing spray surface of the body at the same enamel pressure, greater enamel layer thicknesses on the car body would result in the areas of smaller facing surfaces while in the areas of larger facing surfaces thinner enamel films would be obtained on the car body. This is undesirable for many reasons.

Due to the fact that the program control device will control the amount of atomized enamel in accordance with a previously loaded program which allows for the contour and/or shape of the body to be enameled, the pressures in the control air lines for the enamel pressure regulators of the enamel atomizers are always adjusted contingent upon the areas facing the respective enamel atomizers. That is, the pressure in the control air lines is increased at a larger area and reduced at a smaller area. An enamel application can be obtained with a uniform and close-tolerance film thickness. The adjustment of the enamel pressure for an enamel atomizer contingent upon the size of the spray surface facing it can be accomplished, based upon a basic pressure for each enamel type. The enamel pressure is reduced accordingly when the enamel atomizer is facing a smaller area than contemplated. The base value for the enamel pressure may also be selected for a specific enamel, in which case the enamel pressure for a larger area facing the enamel atomizer would have to be increased and vice versa. It is important at any rate, that the enamel pressure for each enamel atomizer, based upon a base value for the enamel type used, be adjusted proportionally to the body area situated in the spray range of the enamel atomizer.

The invention will be more fully explained hereafter with reference to the single drawing, which shows an illustrative arrangement of an enamel quantity control system according to the invention.

Car bodies are advanced on a conveyor in the direction of the arrows through a spray booth 1, with bodies 2 and 3 being shown. Enamel atomizers 4 and 5 (in practice a considerably greater number, for instance twelve, are used) are provided for the enamel application. Enamel atomizers 4 and 5, for the generally practiced electrostatic paint spraying, are connected to a direct current high voltage supply 6 via an electric line 7. The car bodies 2 and 3 are grounded.

A first enamel supply container 8a contains red enamel, a second one 8b contains blue enamel, and a third enamel supply container 8c contains green enamel. Each enamel supply container is connected with a pump 9a, 9b or 9c which causes its respective enamel to circulate in an enamel circulation line 10a, 10b and 10c, respectively. In practice, considerably more enamel types are used, for instance 5.

Referring to the enamel atomizer 4 for the red color, an enamel pressure regulator 11a is provided. For the blue color an enamel pressure regulator 11b is provided. For the green color an enamel pressure regulator 11c is provided. The enamel pressure regulators 11a, 11b and 11c are connected with a control air line 13.

Correspondingly, a red enamel pressure regulator 12a, a blue enamel pressure regulator, 12b, and a green enamel pressure regulator 12c are connected to the enamel atomizer 5. The enamel pressure regulators 12a, 12b and 12c are connected with a control air line 14.

The pressure in each of the control air lines 13, 14 permits control of the enamel pressure regulators that are connected to them, with the respective enamel pressures essentially being proportional to the pressure in the control air lines.

The control air line 13 is connected with an air pressure regulator 15, and the control air line 14 with an air pressure regulator 16. The air pressure regulator 15 has a pressure gauge 17 coupled to it. Air pressure regulator 16 has a pressure gauge 18 coupled to it.

A reversible synchronous motor 19 is coupled via an elastic coupling to drive the air pressure regulator 15, which is of conventional design. The pressure set by the air pressure regulator 15 for the control air line 13 can be increased or reduced, contingent upon the number of shaft revolutions of the synchronous motor 19 in one or the other direction of rotation. In terms of drive, the synchronous motor 19 additionally is coupled to a ten-turn potentiometer 20 which permits a feedback of the actual pressure set by the pressure regulator 15. A spindle (not shown) also driven by the synchronous motor 19, with a driven nut (not shown), assumes, by way of two adjustable limit switches (not illustrated), the necessary limitation of the adjustment range of the synchronous motor 19. The pressure range controlled by the air pressure regulator 15, by means of the synchronous motor, corresponds from 0–4 bars, and the adjusted pressure is nearly linear to the number of shaft revolutions which the synchronous motor 19 executes.

The potentiometer 20 is wired in a Wheatstone bridge circuit which, in addition to the potentiometer 20, also comprises adjustable resistors 21a, 21b and 21c situated as illustrated in the drawing. As follows from the drawing, the control signal for the synchronous motor 19 is picked up on the bridge diagonal and fed to the synchronous motor via an amplifier 24.

The value of the adjustable resistor 21a is adjusted by program controlled switch openings and closings in the program control device 25, which thus sets the value for the pressure to be adjusted by the air pressure regulator 15 on the control air line 13.

Associated with the air pressure regulator 16 are a synchronous motor 26, a ten-turn potentiometer 27, adjustable resistors 28a, 28b and 28c, and an amplifier 31, which with regard to their design, arrangement, and wiring, are identical to those associated with the air pressure regulator 15.

Stored in the program control device 25, for each of the colors used, is a callable specific base value for each adjustable resistor, which corresponds to a predetermined enamel pressure on the respective enamel atomizer. Also stored in the program control device 25 are programs for each enamel atomizer by means of which one of the respective adjustable resistors 21a, 21b, 21c, 28a, 28b or 28c can be selected to change, by closing a switch in the program control device 25, up or down, the balancing values of the bridges, in accordance with the size of the enameling area facing the pertinent enamel atomizer, based upon a base value.

The enamel atomizers 4, 5 are arranged at two points situated spaced in the direction of travel of the car bodies, as follows from the drawing. There is additionally stored in the program control device 25 a program which insures that while the enamel atomizer 4 continues to complete the enameling of car body 2, and although the next car body 3 is already advanced to the enamel atomizer 5, and an enamel change is required for the enamel atomizer 5, it will be rinsed clean, the changeover to the next color initiated and the enamel pressure regulator 16 set to the new value for the required pressure on the air control line 14 by selection of one of the adjustable resistors 28a, 28b and 28c.

With all of the enamel pressure regulators of an atomizer always being supplied the same pressure on the air control line, it is natural for selection of a specific color to block the other paint feed lines. This is accomplished by way of separate valves controlled by the program control device 25. A more detailed description of these valves and their control is not necessary, since they are customary in prior systems.

For further explanation let it be assumed in the following that the car body 2 is to be enameled red and the car body 3 green. As the front end of the body 2 reaches enamel atomizer 5 during its production line travel, an instruction is introduced in the program device 25 after which the body 2 is to be enameled red. The instruction can be read automatically e.g., from a code card which travels along with the body 2, and stored in the program control device 25. Next, the program control device 25 issues the necessary instructions for rinsing of the enamel atomizer 5, opening of the enamel feed line for the red enamel, and selecting one of the resistors 28a, 28b, 28c for a resistance that corresponds to a pressure of 2.2 bars on the control air line 14. As the front wheel well of the body 2 passes the enamel atomizer 5, the program control device 25 switches to select a reduced value one of variable resistors 28a, 28b and 28c so that a pressure of 1.8 bars will be carried on the air control line 14. The enamel atomizer 5 will consequently discharge a smaller amount of enamel which corresponds to the exposed enameling surface, so that the film thickness of the applied enamel will remain constant even in the area of the wheel well.

The enamel atomizer 4 has meanwhile been kept at rest by the program control device until the front end of the car body reached it. At that time, the program control device will, if necessary, initiate the cleansing sequence, for the enamel atomizer 4 will open the feed valve for the red enamel and select one of the resistors 21a, 21b, 21c so that a pressure of 2.2 bars will be carried on the control air line 13. The program control device 25 now also assures for the enamel atomizer 4 that the enamel pressure is being changed in accordance with the enameling area which is exposed to the enamel atomizer.

As the rear end of the car body 2 passes the enamel atomizer 5, while the front end of the car body 3 which is to be enameled green approaches the enamel atomizer 5 and the program control device 25 has received the appropriate instruction by way of the code card of the body 3, the program control device initiates the appropriate preparation of the enamel atomizer 5 for the new enameling process as described. To begin with, the enamel atomizer 5 is again, staged through the cleaning sequence. Next, the program control device 25 selects one of variable resistors 28a, 28b or 28c to set the pressure on control air line 14 to a value corresponding to 2 bars control air pressure as required for the green enamel. Next, the valve for the green enamel is opened, and the enameling process of the body 3 begins.

The enamel atomizer 4 continues to enamel the body 2 red while the enamel atomizer 5 already has begun to enamel the body 3 green, with each of the two enamel atomizers being operated at the proper enamel pressure adjusted to the respective enamel type. Additionally, the enamel pressure is adapted to the enameling surface facing the enamel atomizer so as to obtain a uniform enamel film. As the front wheel well area of car body 3 passes the enamel atomizer, the program control device 25 selects a different one of resistors 28a, 28b or 28c to reduce the bridge balancing resistance value so that a pressure of 1.6 bars will be carried on the air control line 14. The enameling process is then continued appropriately.

What is claimed is:

1. A control system for the coating of articles in a production operation in which the articles are conveyed sequentially past an atomizing device for atomizing coating material, a plurality of different coating material sources, and means for coupling the atomizing device to the different coating material sources, the control system including a plurality of coating material pressure regulators, one for each different coating material to be dispensed from the atomizing device, the means for coupling the atomizing device to the different coating material sources including the coating material pressure regulator, the coating material pressure regulator including a control input, an analog coating material pressure control means for generating a signal related to the desired coating material pressure to be maintained by the coating material pressure regulator, the analog coating material pressure control means including a control input and a controlled output, means for coupling the control input of the coating material pressure regulator to the controlled output of the analog coating material pressure control means, a plurality of signal sources, each providing a signal corresponding to one of a plurality of selected desired different coating material pressures, and means for coupling the signal sources to the analog coating material pressure control means including a plurality of switches and means for switching the switches in a selected desired sequence corresponding to the sequence in which the articles are conveyed past the atomizing device and the characteristics of the different coating materials and the articles themselves to insure that each article is coating substantially uniformly with the proper amount of a selected coating material.

2. The apparatus of claim 1 including a plurality of such atomizing devices and further including an analog coating material pressure control means for each of the plurality of atomizing devices.

3. The apparatus of claim 1 or 2 wherein said atomizing devices are disposed in spaced relation along the path of motion of the articles along a conveyor on which the articles are conveyed so that sequential articles on the conveyor can be coated simultaneously with selected different coating materials.

4. A control system for controlling the quantity of coating material applied to articles sequentially conveyed past an atomizing device comprising:

a coating material pressure regulator, means for coupling the coating material pressure regulator to the atomizing device and to a source of coating material, for regulating the pressure at which coating material is supplied to the atomizing device, the pressure regulator including a control input, a control line coupled to the control input, and a control line pressure regulator coupled to the control line and to a pressure source, for regulating the pressure on the control line, the control line pressure regulator including a pressure-setting mechanism for setting the pressure at which the regulator operates, motor means, means for coupling the motor means to the pressure-setting mechanism for changing the pressure setting of the control line pressure regulator and motor control means for controlling the motor, the motor control means comprising a bridge circuit having first and second inputs, and a motor drive means coupled to the bridge and to the motor means for driving the motor, the first input comprising a feedback means for indicating the pressure setting of the control line pressure regulator, the second input comprising a program control means for controlling the coating material pressure in a selected, desired sequence corresponding to the sequence in which articles to be coated are conveyed past the atomizing device, and the characteristics of the articles and the coating material.

5. The control system of claim 4 wherein there are a plurality of said coating material pressure regulators and a plurality of means for coupling respective coating material pressure regulators to a single atomizing device, each coating material pressure regulator being coupled to a separate source of coating material, and wherein the program control means includes means for selecting the coating material to be applied to the article being conveyed past the atomizing device.

6. The control system of claim 5 wherein the control inputs of the plurality of coating material pressure regulators are commonly coupled to the single control line.

7. The control system of any one of claims 4–6 wherein the motor means comprises a synchronous motor and the first input of the bridge circuit comprises a potentiometer coupled to the shaft of the synchronous motor such that rotation of the motor shaft varies the potentiometer setting.

8. The control system of any one of claims 4–6 wherein the second input comprises a plurality of adjustable resistors, and a plurality of switches for coupling a selected one of the adjustable resistors into the bridge circuit, the switches being controlled by the program control means.

9. The control system of any one of claims 4–6 wherein there are a plurality of atomizing devices, and a plurality of control lines and control line pressure regulators, the pressure setting mechanism of the plurality of control line pressure regulators being controlled by a single program control means.

10. The control system of claim 9 wherein said atomizing devices are disposed in spaced relation along the path of motion of the articles along a conveyor on which the articles are conveyed so that sequential articles on the conveyor can be coated simultaneously with selected different coating materials.

* * * * *